US006343411B1

(12) United States Patent
Sigman

(10) Patent No.: US 6,343,411 B1
(45) Date of Patent: Feb. 5, 2002

(54) APPARATUS FOR REMOVING AND INSTALLING PLUMBING FLANGES

(76) Inventor: John R. Sigman, 15453 N. 2nd Ave., Phoenix, AZ (US) 85023-3622

( * ) Notice: Subject to any disclaimer, the term of this patent is extended or adjusted under 35 U.S.C. 154(b) by 0 days.

(21) Appl. No.: 09/514,393

(22) Filed: Feb. 28, 2000

(51) Int. Cl.[7] .................................... B23P 19/04
(52) U.S. Cl. .................................... 29/263
(58) Field of Search .................... 29/263, 213.1, 29/240.5, 256, 258, 259, 265, 214

(56) References Cited

U.S. PATENT DOCUMENTS

| | | | | | |
|---|---|---|---|---|---|
| 2,380,068 | A | * | 7/1945 | Patton | 29/263 |
| 3,579,793 | A | * | 5/1971 | Williams et al. | 29/240.5 |
| 3,895,652 | A | | 7/1975 | Zach | |
| 3,945,276 | A | | 3/1976 | Sorensen | |
| 4,128,930 | A | | 12/1978 | Tomlinson | |
| 4,460,019 | A | | 7/1984 | Condon | |
| 4,529,007 | A | | 7/1985 | Goforth | |
| 5,054,179 | A | | 10/1991 | Rini | |
| 5,255,435 | A | * | 10/1993 | Shultz | 29/263 |
| 5,363,881 | A | | 11/1994 | Larkin | |
| 5,408,732 | A | * | 4/1995 | Anfuso | 29/263 |
| 5,669,404 | A | | 9/1997 | Guillermo | |
| 5,697,459 | A | | 12/1997 | Sher | |

OTHER PUBLICATIONS

Pasco Specialty & Mfg., Inc., The "Smart" Dumbell, www.pascospecialty.com web page, Copyright 1999, pp. 1–2.

* cited by examiner

*Primary Examiner*—Robert C. Watson
(74) *Attorney, Agent, or Firm*—Tod R. Nissle, P.C.

(57) ABSTRACT

An extractor tool for removing and replacing a plumbing fixture, such as a leaking, rusted tub shoe flange with or without cross hairs, includes a shaft having left-handed threads over most of its length and a frusto-conical wedge near one end terminating in a plurality of axial lugs forming a castle around an axial recess, the other end of the shaft being flatted to receive a wrench. A plurality of separate, arcuate shaped, shoes are slidably positioned around the threaded portion of the shaft and are maintained there by a flexible o-ring forming an expandable body having a central bore portion and at least the inner end adjacent the frusto-conical wedge of the shaft formed with a tapered circular recess. A washer and nut are assembled on the shaft from the threaded end. Both inner ends of the shoes may be formed with the tapered circular recess to make them reversible. The outside surfaces of the shoes and lugs may be knurled for added gripping. The lugs may be tapered and long to aid in engaging deep cross hairs for removal and installation and to accommodate tall toe stop stems. To remove the fixture the castle end is inserted into the flange drain hole, the nut is turned counterclockwise by hand to expand the shoes into a holding grip with the inside adjacent wall structure of the fixture, further counterclockwise turning of the nut with a wrench both tightening the grip and unscrewing the flange. To replace the new flange, insert the castle end into the flange drain hole atop the cross hairs with the lugs in the openings therebetween and turn the shaft clockwise to screw in the flange and tighten with a wrench.

9 Claims, 8 Drawing Sheets

FIG. 4: Prior Art
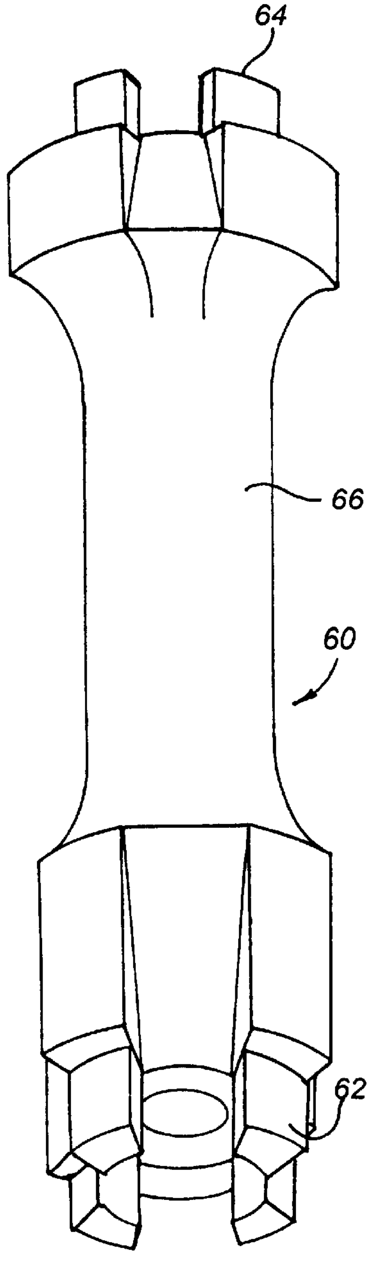
FIG. 3: Prior Art
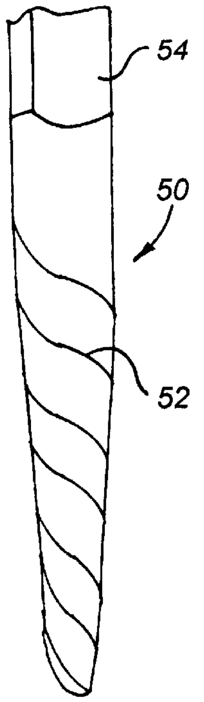

FIG. 5: Prior Art
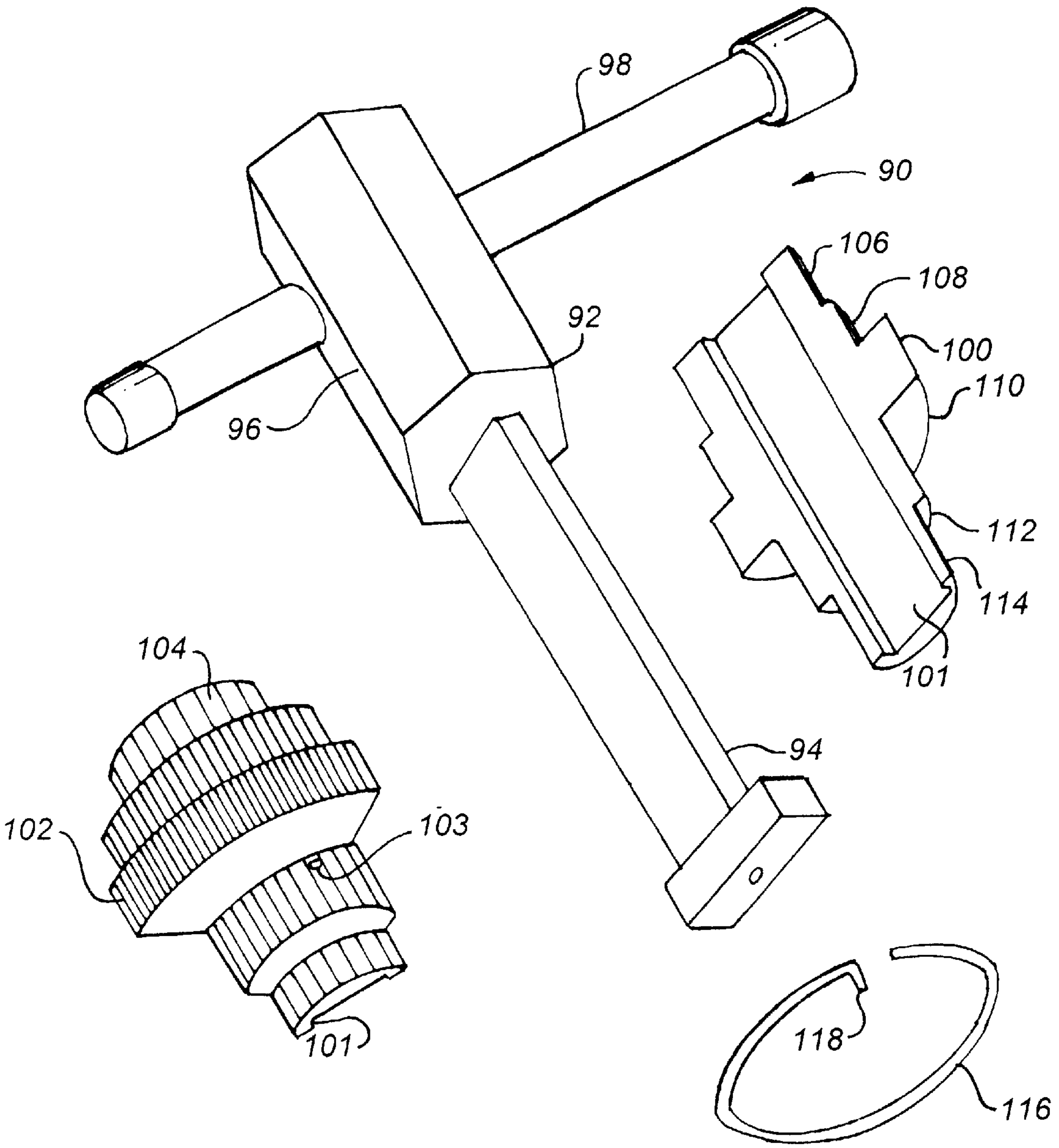

FIG. 6: Prior Art
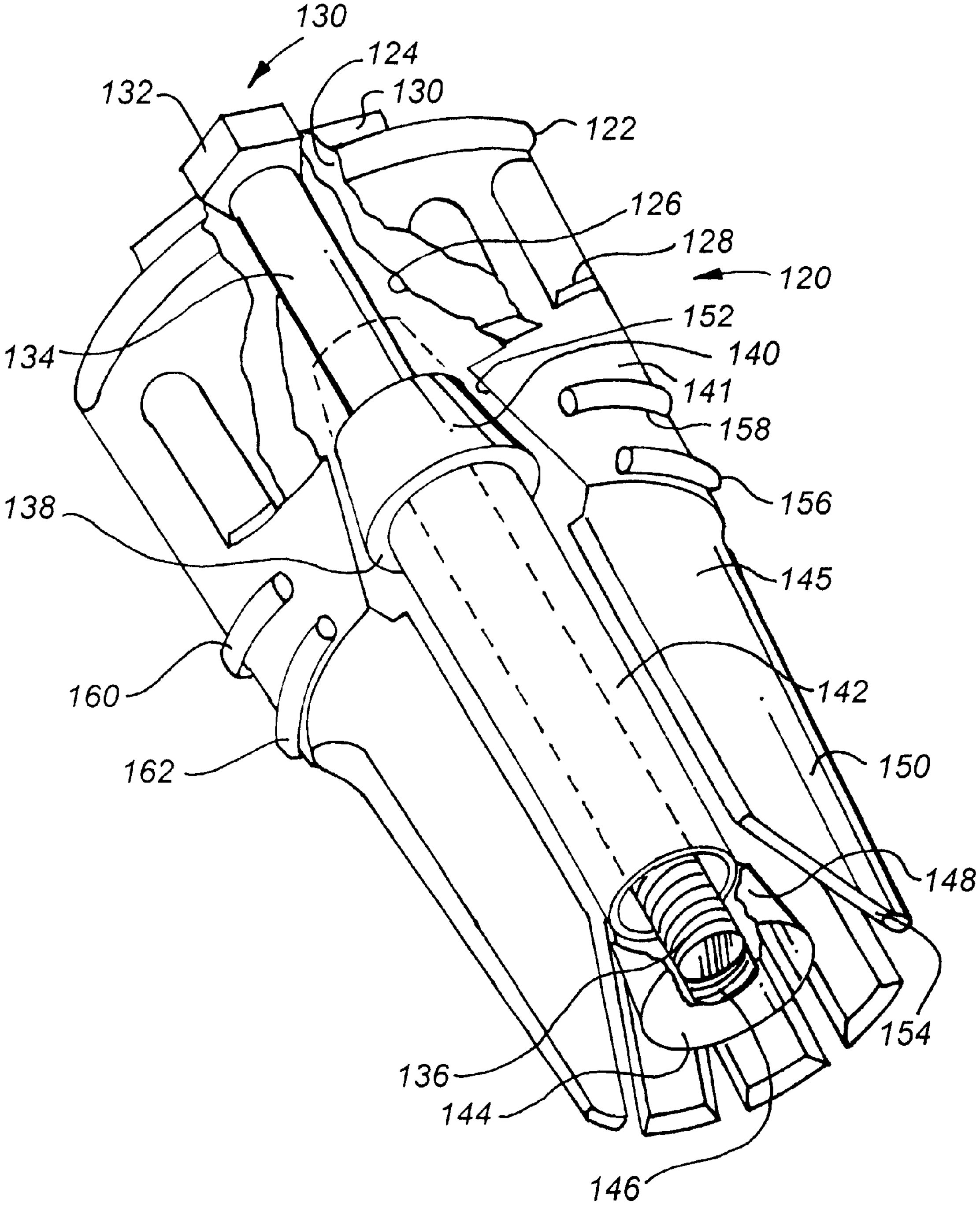

APPARATUS FOR REMOVING AND INSTALLING PLUMBING FLANGES

BACKGROUND OF THE INVENTION

1. Fields of the Invention

The present invention relates generally to apparatuses and methods of removing and installing plumbing flanges, and, more particularly, to removing and installing tub shoe flanges with or without cross hairs, pop up assemblies, lavatory drain flanges, and stub outs of various types with a tool that inserts into the flange drain hole, expands against the inside walls of the drain hole, and by continued counterclockwise turning, unscrews the flange.

2. Discussion of Background and Prior Art a. The Problem Of Removing A Tub Shoe Flange Without Damaging The Tub

One of the significant problems repeatedly faced by plumbers is the removal of a tub shoe flange without damaging the tub.

Shown in FIG. 1 is a typical tub shoe installation 10 which includes polyvinyl chloride pipe 12 connecting at one end to the house drain line 14 and having a tub shoe 16 at the other end with brass thread fitting 18 therein to go against tub 20 drain hole 22 from below the tub and receiving tub shoe flange 24 into tub shoe fitting 18 from above the tub to form a sealed tub drain (sealing washers or plumber's putty not shown). Tub shoe flange 24 has external threads 26 and cross hairs 28 integral therewith. To open and close the drain opening, cup 30 has washer 32 on its lower side and receives through its bore 33 spindle 34 having threads 36 which screw into the threaded opening 29 in the cross hairs. Cap 38 screws 40 into cup 30 to enable the user to pull up on cap 38 to open the drain or push down on cap 38 to close the drain.

When the tub shoe flange 24 has been in place for a long time and needs to be replaced, plumbers find that the tub shoe flange 24 has often become rusted to the tub shoe 16 brass fitting 18 and that there is nothing to grab onto to use to unscrew the rusted flange 24 from the fitting 18 except the cross hairs 28. A typical prior art tool known in the trade as an "easy out" (FIG. 3) with left-handed threads 52 and a square head 54 adapted to receive a wrench for counter-clockwise turning to remove studs and the like will not work in this application since it is too tall, too thin to grab the walls 25 of the flange 24 and too big to fit in the threaded opening 29 in the cross hairs.

If the cross hairs 28 are still in the tub shoe 16, a better choice is the tool known in the trade as a "dumbbell tool" 60 (FIG. 4) having different size castles 62 and 64 at opposite ends. If the outside diameter of one end is small enough to fit into the tub shoe flange central opening 27, the lugs protruding from the castle, if they are long enough, fit into the respective openings 31 between the cross hairs 28, and then a wrench can be applied to the dumbbell central portion 66 to turn it counterclockwise to unscrew the tub shoe flange 24 from the tub shoe fitting 18. The problem usually encountered at this point is the cross hairs 28, weakened by rusting or corrosion, break off.

Confronted now with a "frozen" leaking tub shoe flange 24 and no cross hairs 28, the plumber again finds that he has "nothing to grab onto" and is relegated to using a saw or hammer and chisel to carefully try to remove the tub shoe flange 24 without damaging the tub 20, the tub shoe 16, or the tub shoe fitting threads 18. Often the plumber cannot avoid damaging the tub and may on occasion have to replace the whole tub at a great personal loss to either the customer and/or plumber.

A similar problem is presented when a plumber has to replace a lavatory sink drain flange 72 in a typical pop-up drain lavatory sink installation 70 (FIG. 2.). Pop-up body 72, nut 74, and mack washer 76 are held against sink 75 from below while sink flange 78 is screwed into body 72 from above sink 75 and nut 74 is tightened. Stopper assembly 80 is inserted into body 72 from above the sink 75 and ball rod assembly is inserted into body 72 from below the sink 75, while pop-up rod assembly 84 is inserted up and through the faucet housing (not shown) as is well known in the trade. When sink flange 78 is leaking, rusted, and/or corroded and needs to be replaced, it presents the same problem as the leaking, rusted and/or corroded tub shoe flange 24 discussed above, only in this case there are no cross hairs, the inside diameter of the sink flange 75 is too small to receive the typical castle of the dumbbell tool which cannot work in this application anyway since its side walls are smooth and slippery and not knurled. Thus, even if the plumber tries hammering the dumbbell or any similar tapered tool into the sink flange 78 opening 79, the tool slips when turned and fails to unscrew the sink flange 78 from the body 72. Again, the plumber is left to a hammer and chisel or hacksaw and the hope that he can remove the sink flange 75 without damaging the sink 75.

Accordingly, there is a need for, and it is an object of the present invention to provide a plumber's tool that inserts into the flange drain hole, has moveable parts which can expand against and bite into the inside walls 25 of the flange drain hole, and then, by continued counterclockwise turning, easily and rapidly unscrew the flange from its fitting even in those occasions when the flange is rusted in place and there are no cross hairs.

b. Prior Tools With Expandable Shoes For Extracting Or Spreading

In one prior expandable extractor tool 90 (FIG. 5) having a body 92 with a rectangular shaped main portion 94 and a handle bar 98 through a top portion 96 also configured to receive a wrench, and a pair of moveable shoes 100, 102 having internal rectangular inboard recesses 101 and multiple cylindrical shaped, knurled 104, outside surface portions of varying diameter 106, 108, 110, 112, 114 resiliently held on the rectangular shaped spreader portion 94 by spring 116 with end 118 in hole 103. The shoes may be removed and reversed to position diameter portions 106, 108 at the lower end instead of diameter portions 110, 112 by removing spring 116, reversing the shoes 100, 102 and replacing the spring 116. In operation, the lower end of tool 90 inserted into, for example, the tub shoe flange drain hole 27, and then while holding the outside knurled surfaces 106, 108, 110, 112, 114 with one hand so that they do not turn, the body portion 92 is rotated with the other hand thereby spinning the rectangular spreader portion 94 relative to the rectangular recesses 101 and spreading the shoes 100, 102 against the bias of spring 116 until they engage the inside walls 25 of the tub shoe flange 24, and then, by continued counterclockwise turning, unscrew the tube shoe flange 24 from its fitting 18. There are many problems with this tool that prevent it from working in most cases.

1. It is very difficult to get the spreader portion 94 to spin inside of the shoes 100, 102 against the compression of spring 116.

2. It is extremely difficult to get a selected one the knurled 104 surfaces 106, 108, 110, 112, 114 to bite into the metal of the tub shoe flange 24 walls 25 except when there is a very good match of outside diameter of the shoes with the inside diameter of the flange walls such that the spreader 94 can get into a nearly orthogonal position relative to the shoes 100, 102 in order to be in a position to get a good bite into the walls 25 of the opening without slipping. This is definitely a two handed operation.

3. A third hand is the needed to turn the tool using the bar 98 or a wrench.

4. Normally the plumber is not strong enough to get a bite into walls 25 with the bar 98, and the tool slips in the opening 27, espelally if the plumber is alone.

A second prior spreading tool (FIG. 6) is used to spread tail pipe end openings of automobiles. This tool has a large, heavy, round, steel body 122 having a top end shoulder 123, a central bore 124 and a dome shaped interior cavity 126 and a notched bottom end 128 through which is disposed bolt assembly 130 having head 132, shank 134 and threaded end 136, carrying upper sleeve type spreader 138 with tapered walls 140, middle positioning sleeve 142, and owe spreader 144 with tapered walls 148 and interior threads 146. Disposed around the bolt assembly are eight identical movable shoes 150 of which only two are shown in FIG. 6 for simplicity. Each shoe 150 has a tapered upper interior notch 152 in a larger outside diameter portion 153 and a tapered lower interior end wall 154 in an outside reduced diameter portion 155. Upper recessed notches 152 receive upper tapered spreader 138 and lower tapered end walls 154 receive lower tapered spreader 144. Shoes 150 each have a pair of exterior annular recesses 156, 158 into which are received retainer Wrings 160, 162 which hold all 8 shoes resiliently in position when the tool is finally assembled.

In operation, reduced outside diameter portion 155 is inserted into an automobile tailpipe (not shown) and held in place with one hand while bolt head 134 is turned clockwise with a wrench with the other hand. As lower spreader 144 is drawn toward head 134, the upper spreader 138, positioning sleeve 142 and lower spreader 144 move as an assembly and spread the shoes 150 uniformly and evenly both at the top and at the bottom against the bias of retainer o-rings 160, 162. The tailpipe opening is spread and now tailpipes and muffler can be easily assembled s is known in the trade.

There are many problems with this tool as follows:

1. It is too large and too heavy for plumbing work.

2. It will not fit into the largest tub shoe flange openings.

3. The shoes cannot be spread by hand because too much force is required to turn the bolt.

4. The outside surfaces are not knurled and do not bite into the walls of the tailpipe.

Accordingly, there is a need for, and it is an object of the present invention to provide a small, sturdy, lightweight, plumber's tool that inserts into the flange drain hole, has moveable parts which can be easily expanded against the inside walls 25 of the flange drain hole with the hands and will remain in place by itself or can be held in place with one hand while the other hand is used to easily and rapidly spread the moveable parts to a hands tight position against walls 25 by initial turning of a nut, can then be easily made to bite sharply into the walls of a flange with a wrench by further turning of the nut, and can then easily unscrew the flange from its fitting by continued turning, even in those occasions when the flange is rusted in place and there are no cross hairs.

A third spreader tool 170 of the prior art (FIGS. 7, 8) by Guillermo in U.S. Pat. No. 5,669,404 is used to lift the upper half of a diverter valve assembly from within a faucet. The tool 170 includes shaft 172 having threads 174 at one end and a frusto-conical wedge portion 176 at the other end, a split tab sleeve 178 having a bore diameter smaller than the frusto- conical wedge, projections 180 and a plurality of knurled 185 tabs 182. Slide member is inserted over threaded end 174 of the shaft and abuts against projections 180 of sleeve 178 at the end opposite the tabs 182 and also overlaps the threaded end 174 of the shaft 172. A nut 188 is threaded on to shaft 172 to meet washer 186.

In operation, the split sleeve 178 end of the assembled tool 170 is inserted into the top half 192 of the diverter valve 190, the nut 188 is turned clockwise 196 on threaded 174 shaft 172 driving slide member 184 down against projections 180 of sleeve 178 which is driven down against frusto-conical taper wedge 176 expanding tabs 182 against the inside walls of the upper half 192 of the diverter valve 190. With the split sleeve 178 firmly in place, the entire tool 170 is then lifted with some force causing the upper half 192 of the diverter valve 190 to separate from the lower half 194 and allowing the upper half to be removed, cleaned and replaced without unscrewing the lower half of the diverter valve 194 from the threaded tube 198 secured therein from below by using a separate tool not relevant here.

There are many problems with this tool as follows:

1. The tool is merely used for lifting the upper half of a diverter valve which is snap fit together with its lower half and is easily separated therefrom.

2. The tool is not sturdy enough for use in an application to unscrew tub shoe flanges that are frozen or rusted together after years of use.

3. The knurled tabs weaken after continuous flexure and break off.

4. The nut is turned clockwise to expand the tabs. This is the wrong direction if the tool is to be used to unscrew a flange and only causes the flange to be tightened in its fitting which is counter productive.

5. The tool will loosen if the tightened nut is turned counterclockwise with a wrench to unscrew a flange since the unscrewing action requires a countercklckwise turn which is the same direction the bolt is turned to loosen the bolt.

Accordingly, as amply demonstrated above, there is a long felt and unfilled need for, and it is an object of the present invention to provide, a small, light, rugged plumber's tool that inserts into the flange drain hole, has expandable, resiliently biased shoes with knurled surfaces which can be easily expanded to a hands tight position against interior walls 25 of a flange drain hole by initial counterclockwise turning of a nut, can then be easily made to bite sharply into the walls of a flange with a wrench by further counterclockwise turning of the nut, and can then easily unscrew the flange from its fitting by continued counterclockwise turning, even in those occasions when the flange is rusted in place and there are no cross hairs.

BRIEF SUMMARY OF THE INVENTION

Set forth below is a brief summary of the invention which achieves the foregoing and other objects and provides the foregoing and hereafter stated benefits and advantages in accordance with the structure, function and results of the present invention as embodied and broadly described herein. Applicant's invention includes independently both the apparatus and the methods described herein which achieve the objects and benefits of the present invention. Both formats of the invention are described below, and it is applicant's intention to claim both formats even though from time to time below for purposes of clarity and brevity applicant will use either one or the other format to describe various aspects and features of the invention.

A first aspect of the invention is an extractor, or spreader, tool which includes a shaft having a frusto-conical wedge, or enlarged tapered portion, and left-handed threads, a plurality of segments, or shoes, resiliently retained around the threaded portion of the shaft, and a nut threaded on the threaded portion of the shaft for raising the frusto-conical wedge, or enlarged tapered portion, to expand the segments, or shoes.

A second aspect of the invention includes a method of making an extractor, or spreader, tool which includes the steps of providing a shaft having a frusto-conical wedge, or enlarged tapered portion, and left-handed threads, resiliently retaining a plurality of segments, or shoes, around the threaded portion of the shaft, and threading a nut on the threaded portion of the shaft for raising the frusto-conical wedge, or enlarged tapered portion, to expand the segments or shoes.

A third aspect of the invention is a method of removing a plumbing fixture flange which includes the steps of inserting an extraction tool having a plurality of separate radially expandable members resiliently maintained around a tool body into a drain opening of the flange, expanding the members into tight contact with an adjacent wall structure of the flange, and while holding the segments in the tight fitting expanded position, turning the tool counterclockwise to remove the flange.

Further features of all of the above aspects of the invention include the segments are arcuate shaped movable shoes, there are three segments which form substantially an expandable collar around the shaft the inside diameter of which is smaller than the diameter of the frusto-conical wedge, each segment having a central bore portion of uniform diameter for fitting cent the threaded portion of the shaft and a changing diameter portion smaller Fan the diametr of the frusto-conical portion of the shaft for fitting adjacent the frusto conical portion of the shaft, each segment being positioned around the shaft with its changing diameter portion nearest the frusto-conical portion of the shaft, each segment having a central bore portion of uniform diameter for fitting adjacent the threaded portion of the shaft between a changing diameter portion smaller than the diameter of the frusto-conical portion of the shaft at each end of the segment for alternatively fitting adjacent the frusto conical portion of the shafts, the outboard surfaces of each segment being knurled, a castle at the end of the shaft ad t the frusto-conical wedge, the shaft terminating at one end in a plurality of axially extending and radially aligned lugs., there being four lugs each 90 degrees apart, the outboard surfaces of the lugs tapered in a direction opposite the taper of the frusto-conical wedge, the outboard surfaces of the lugs being knurled, a central recess extending axially between the lugs, the central recess extending sufficiently to a to accommodate a long toe stop stem, the resilient retainer being an o-ring, and a washer between the nut and the segments.

Further features of this aspect of the invention are wherein the step of expanding the members into tight contact further comprises the stop of biting into the adjacent wall structure with a knurled outboard surface of the members, Further features of the second through fifth aspects of the invention are the same as those set forth above for the first aspect of the invention which are hereby incorporated herein by reference.

The advantages of the invention are as follows:

1. The tool is small and lightweight, but also sturdy and rugged.

2. Enables extraction of a wide variety of frozen drain flanges in and out of the plumbing fields, including toe stop flanges with extra high centers.

3. Eliminates risk of damaging the tub, sink, or shower during extraction.

4. Works with or without cross hairs in the fixture to be removed.

5. Knurled surfaces allow extra torque for really stubborn, rusty flanges.

6. Removes frozen flanges rapidly.

7. Is easy to operate with two hands and tightens easily by hand-turning the nut.

8. Once tightened, just keep turning in the same direction with a wrench to remove the flange.

9. Inexpensive enough that every plumber can afford one.

10. Reversible shoes extend the life of the tool

11. Extra torque from knurled surfaces on castle lugs for use during extraction or installation of a new fixture 12. Tapered, longer castle lugs further increase utility for other applications where the cross hairs are deep.

13. Installs new tub shoe flanges easily by interlocking with the cross hairs.

BRIEF DESCRIPTION OF THE SEVERAL VIEWS DRAWINGS

FIG. 3 is a perspective view of a first prior art "easy out" tool.

FIG. 4 is a perspective view of a second prior art "dumbbell" tool.

FIG. 5 is an exploded perspective view of a third prior art expandable extractor tool.

FIG. 6 is a partial perspective view of a fourth prior art automotive tailpipe spreader tool showing only two of eight expandable shoes for simplicity in presentation and understanding.

DETAILED DESCRIPTION OF THE INVENTION

Figure 1:
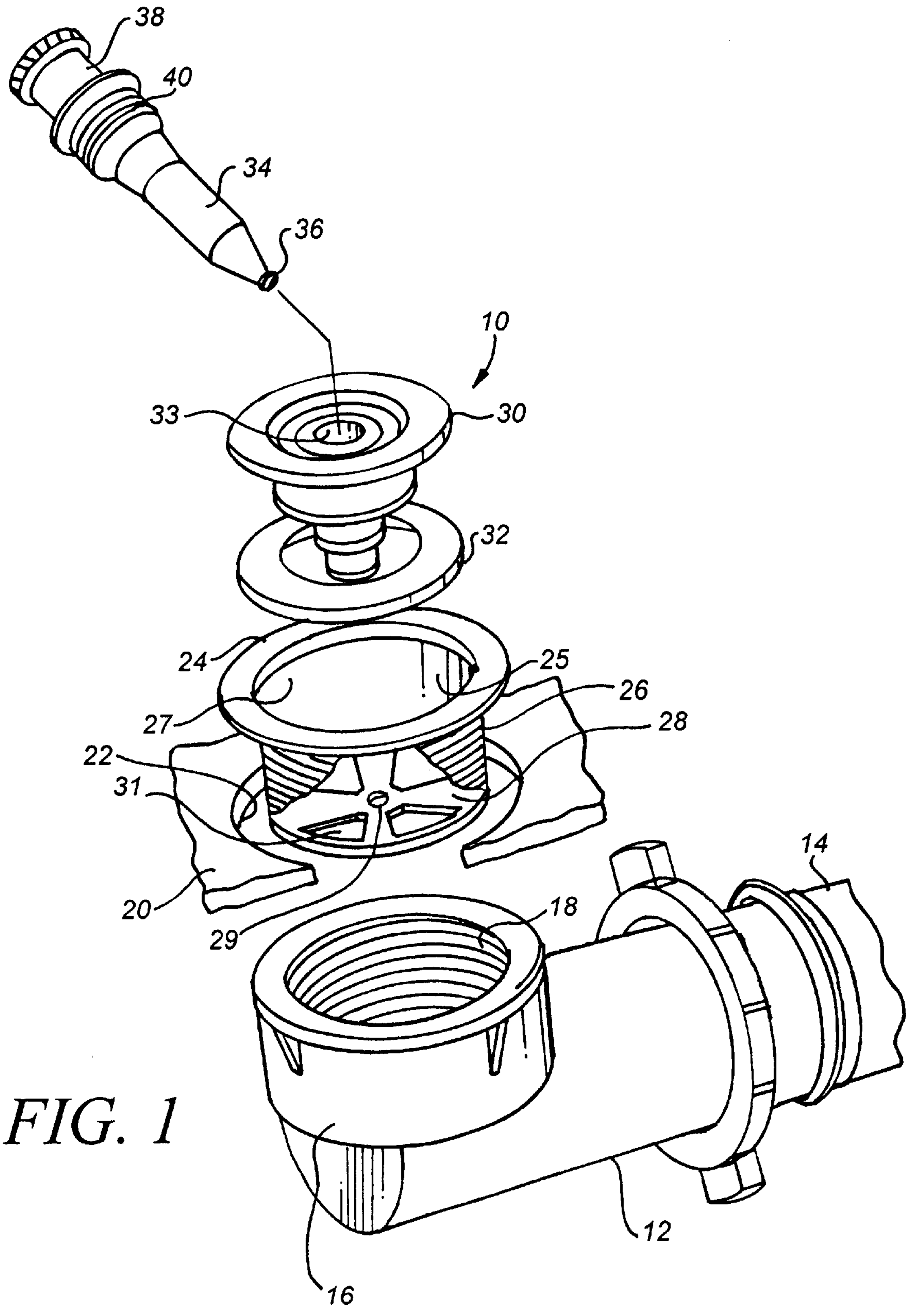
FIG. 1 is an exploded perspective view in partial section of a typical tub shoe flange installation to which the present invention is applicable.
Figure 2:
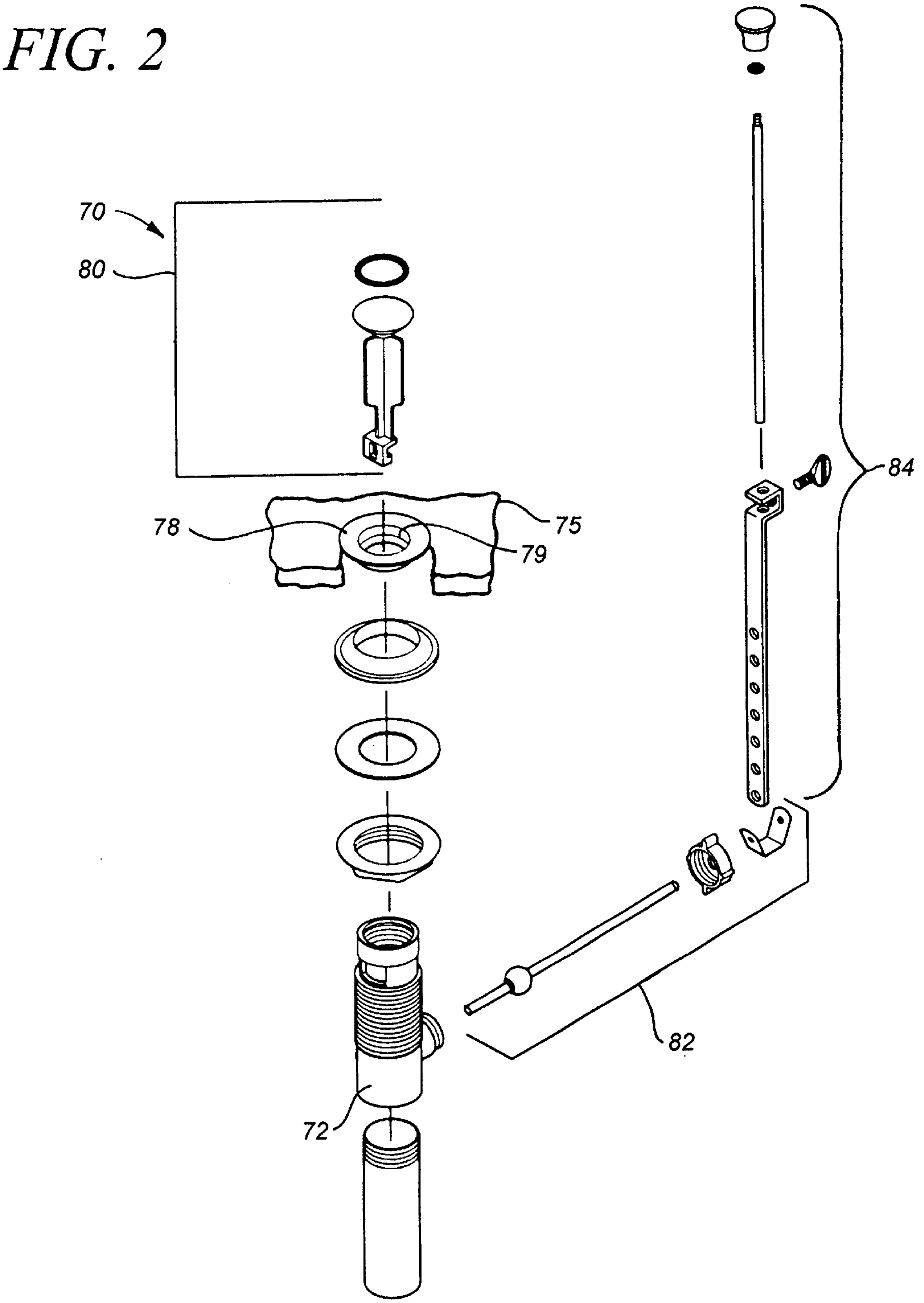
FIG. 2 is an exploded perspective view of a typical pop-up lavatory flange installation to which the present invention is applicable.
Figure 8:
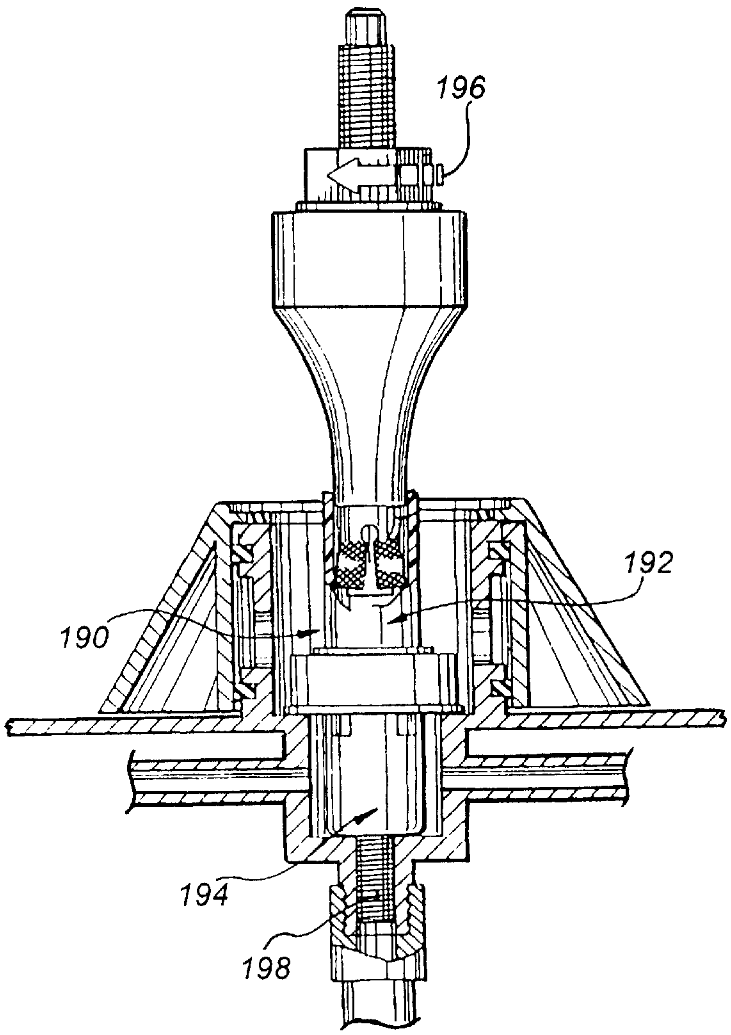
FIG. 8 is a front elevation in partial section of the tool of FIG. 7 being used to lift out the upper half of a diverter valve in a faucet.
Figure 7:
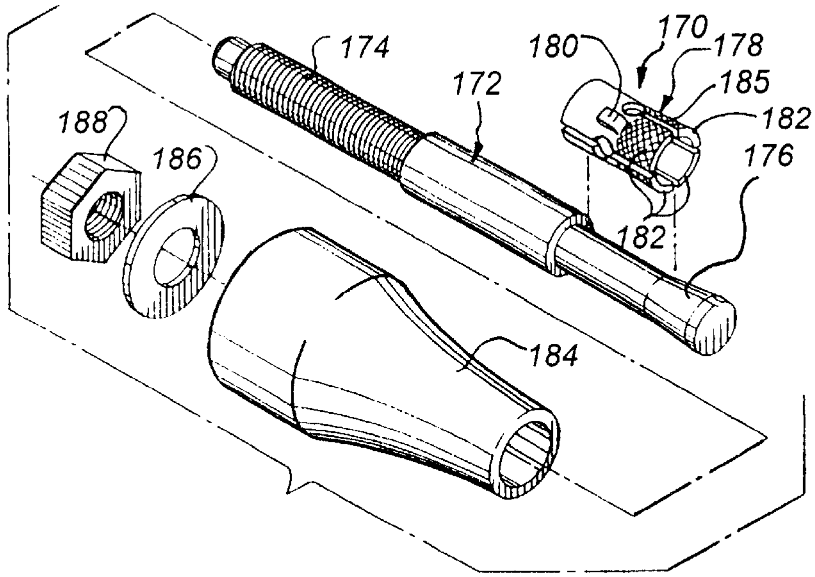
FIG. 7 is an exploded perspective view of a fifth prior art expandable diverter valve extractor tool.
Figure 9:
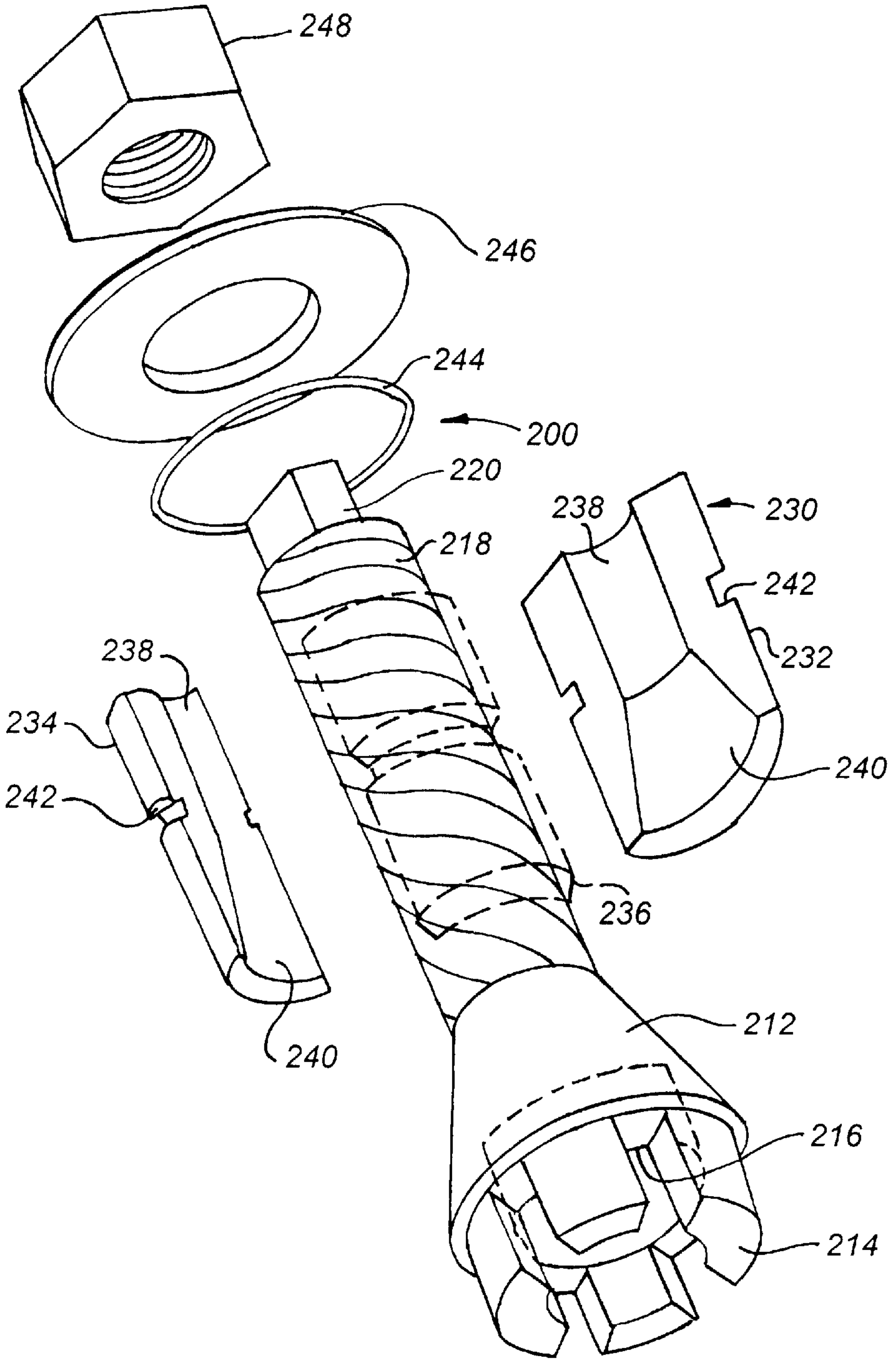
FIG. 9 is an exploded perspective view of a first embodiment of the plumber's extractor tool of the present invention.

As seen in FIG. 9 the extractor tool of the present invention includes a shaft 210 having left-handed thread 218 throughout most of its length terminating at one end in a flatted configuration 220 adapted to receive a wrench and having an outwardly extending frusto-conical or enlarged tapered shape 212 at the other end terminating in a plurality of axially extending lugs 214, called the "castle" in the trade, surrounding a central recess 216. Mounted on the shaft over the threaded area is a shoe assembly 230 having a central bore 238 and which includes, in the preferred embodiment, a plurality of three shoes or arcuate segments 232, 234, 236 retained together by resilient o-ring 244 received in annular groove 242. Each shoe has a tapered recess 240 at its end nearest the frusto-conical end 212 of the shaft 210 but having an inside diameter less than the outside diameter of the frusto-conical section 212. The tool 200 also includes a washer 246 and a nut 248.

Figure 10:
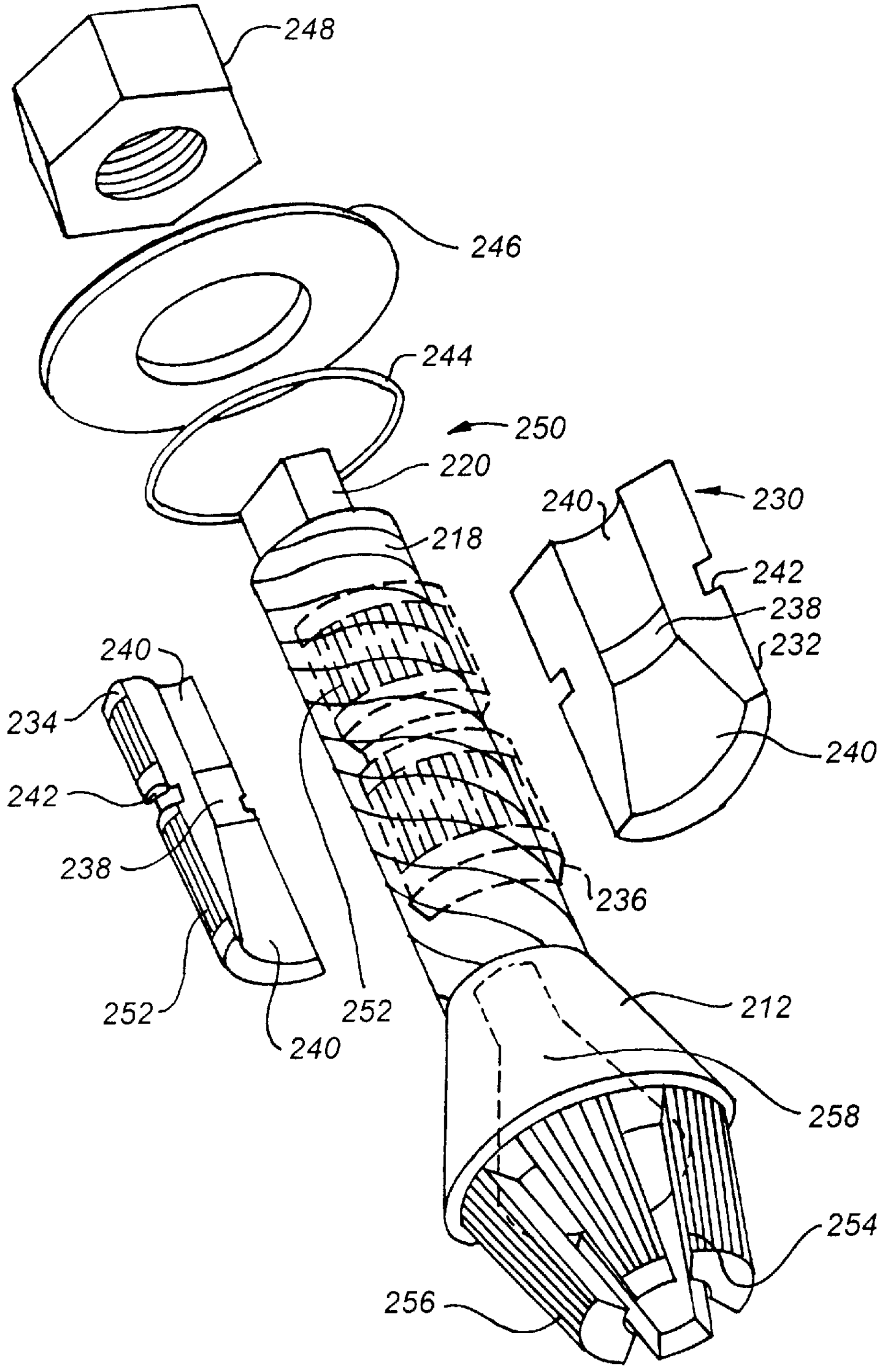
FIG. 10 is an exploded perspective view of a second embodiment of the plumber's extractor tool of the present invention.

As seen in FIG. 10, a second embodiment of the present invention has features identical to the first embodiment which are identified by identical numbers. Additionally, this version of the invention includes knurling 252 on all of the shoe surfaces and shoes 232, 234, 236 are made reversible in that they bear a tapered recess 240 at each of their ends. This feature provides the added benefit of being able to reverse the shoes if the knurling 252 on one of the shoe surfaces gets damaged or wears out. The knurling 256 is also extended to the surfaces of the lugs 254 to give better gripping action during removal, if the cross hairs are present, and during installation when the lugs are placed between the cross hairs. The lugs 254 are made longer and the recess 258 is made considerably deeper to accommodate deeper cross hairs or longer toe stop stems, respectively.

Additional optional features include a second set of shoes to accommodate additional sizes of flange drain hole openings, stub outs, urinal/toilet spuds, copper pipe, and the like. The urinal and water closet (toilet) spud can be removed without an attachment. An additional plumbing attachment is contemplated for use in the removing cets from within faucet valves and provides stability while applying torque. An additional automotive attachment is contemplated for use in removing steering wheels and sizing tailpipes and mufflers.

The shaft is preferably made from hardened steel and coated with black oxide so that it will not rust. The shoes are preferably made from aluminum.

In operation, to remove a stubborn tub shoe flange 24, for example, the castle end of the extractor tool 200, 250 of the present invention is inserted into the drain hole 27 of the tub shoe flange 24 so that the castle lugs 216 enter the openings 31 between the cross hairs 28 and rest upon and engage the cross hairs 28, if the cross hairs are present. If no cross hairs 28 are present, then the tool 200, 250 is held in one hand in a position with the shoe assembly 230, adjacent to the inside walls 25 of the tub shoe flange drain hole opening 27. The nut 248 is then turned counterclockwise with the other hand to raise the frusto-conical wedge 212 into the shoe assembly 230 expanding the shoes 232, 234, 236 radially outward against the inner walls 25 of the tub shoe flange 24 drain hole 27 until a snug fit it obtained by hand. Then a wrench (not shown) is applied to the nut 248 and the counterclockwise turning is continued to both further tighten the grip and to unscrew the tub shoe flange 24. If the cross hairs 28 are present, the tool can rest on the cross hairs with the lugs 214, 254, in the openings 31, and the lugs 214, 254 and knurled surfaces 256 thereon allow added torque to be applied to remove frozen or rusted flanges.

For installation, the tool 200, 250 is inserted into the tub shoe flange 24 drain hole 27 resting on the cross hairs 28 with the lugs 214, 254 in the openings 31, the shaft is then turned clockwise with a wrench applied to the flatted top end 220.

The foregoing description of a preferred embodiment and best mode of the invention known to applicant at the time of filing the application has been presented for the purposes of illustration and description. It is not intended to be exhaustive or to limit the invention to the precise form disclosed, and obviously many modifications and variation are possible in the light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. An extractor tool comprising:

a shaft having a frusto-conical wedge and left-handed threads, a plurality of segments resiliently retained around the threaded portion of the shaft, a nut threaded on the threaded portion of the shaft for raising the frusto-conical wedge to expand the segments, and a castle at the end of the shaft adjacent the frusto-conical wedge.

2. An extractor tool comprising:

a shaft having a frusto-conical wedge and left-handed threads, a plurality of segments resiliently retained around the threaded portion of the shaft, a nut threaded on the threaded portion of the shaft for raising the frusto-conical wedge to expand the segments, and a plurality of axially extending and radially aligned lugs at one end of the shaft.

3. An extractor tool comprising:

a shaft having a frusto-conical wedge and left-handed threads, a plurality of segments resiliently retained around the threaded portion of the shaft, a nut threaded on the threaded portion of the shaft for expanding the segments with the frusto-conical wedge, and turning the segments, and a castle at the end of the shaft adjacent the frusto-conical wedge.

4. An extractor tool comprising:

a shaft having a frusto-conical wedge and left-handed threads, a plurality of segments resiliently retained around the threaded portion of the shaft, and a nut threaded on the threaded portion of the shaft for expanding the segments with the frusto-conical wedge, and turning the segments, the shaft terminating at one end in a plurality of axially extending and radially aligned lugs.

5. The tool of claim 4 further comprising four legs each ninety degrees apart.

6. The tool of claim 4 wherein the lugs include outboard surfaces tapered in a direction opposite the taper of the frusto-conical wedge.

7. The tool of claim 6 wherein the outboard surfaces of the lugs are knurled.

8. The tool of claim 4 further comprising a central recess extending axially between the lugs.

9. The tool of claim 8 wherein the central recess extends sufficiently to accommodate a long toe stop stem.

* * * * *